Patented Nov. 20, 1934

1,981,125

UNITED STATES PATENT OFFICE 1,981,125

PROCESS OF TREATING POLYHALITE

Eugene P. Schoch, Austin, Tex.

No Drawing. Application September 19, 1931,
Serial No. 563,899

4 Claims. (Cl. 23—40)

It is well known that polyhalite, a mineral with a composition expressed by the chemical formula

$2CaSO_4, MgSO_4, K_2SO_4, 2H_2O$ when put in contact with water allows its soluble constituents, e. g. magnesium sulphate and potassium sulphate, to dissolve only very slowly even though the mineral may be ground up very fine; with cold water a day or two will be required, and even with hot water four hours or more are required. Furthermore the solution of potassium sulphate thus obtained will be very dilute, because the residual calcium sulphate from the polyhalite recombines with potassium sulphate if the latter exceeds certain limits. At 31.8° C. this limit is a solution containing only 3.5% of potassium sulphate, and at 100° C., only 1%. Hence it is that the direct extraction of potassium sulphate from polyhalite is commercially uneconomical. Various attempts have been made heretofore to overcome this difficulty but with results that have not been found entirely successful.

For example, ore has been heated to expel its water of crystalization, and to "dead burn" the calcium sulphate so that it will not react with, or dissolve in, hot water until after the lapse of enough time to dissolve all of the potassium sulphate (and magnesium sulphate) with the formation of concentrated solutions. This procedure involves the expense of a furnace installation and a relatively long roasting operation such as one hour or more. Furthermore, the roasted material must be boiled in water for an hour or more to dissolve the soluble salts because the roasting action has affected these so that they dissolve very slowly.

Another process calls for boiling the mineral with a solution of ammonium carbonate, the latter reacting with the calcium sulphate and with the magnesium sulphate to produce calcium carbonate and magnesium carbonate, respectively, as well as ammonium sulphate, whereby the potassium sulphate in the solution may attain a high concentration because there is no calcium sulphate present to counteract this. This process naturally involves the use of large quantities of ammonium carbonate and hence it is not usable except when the resulting ammonium sulphate itself is a desirable by-product.

It will be noticed that the above methods have the common characteristic of transforming the carcium sulphate so that it does not act upon the dissolved potassium sulphate.

I have discovered a method for extracting potassium sulphate from polyhalite which, in contradistinction to both the above methods, leaves the calcium sulphate unchanged or unaffected. In further contrast to the first mentioned prior process, my method requires no furnace and only a very short and inexpensive leaching operation, and in further contrast to the second mentioned prior process, my method requires only a relatively small amount of one of the cheapest chemicals namely, lime. Furthermore, my method yields the other components of the polyhalite in a form directly available for the cheap production of commercial products from them; and yields the potassium sulphate in the form of an approximately 8% solution practically free from other ingredients so that the simplest sort of evaporating equipment can be used to remove the water economically.

I have found that when a solution of lime is mixed with hot water in which finely powdered polyhalite is suspended, the magnesium sulphate in the polyhalite reacts very rapidly with the lime to form calcium sulphate and magnesium hydroxide; and that the potassium sulphate dissolves simultaneously just as rapidly. In a boiling hot mixture, these changes take place so rapidly as to require only a few minutes for their completion provided, that the polyhalite is finely divided, that the lime is added in chemically proportionate amounts, and that the mixture is stirred vigorously.

Thus, in a trial which I have carried out, I suspended ten grams of finely ground polyhalite in a few cubic centimeters of boiling water, added a few drops of thymolphthalein indicator solution, and then added to this mixture (from a burette) a solution of lime of known strength, the mixture being heated to keep it at the boiling point. As long as the amount of lime added was less than that corresponding to the 2 grams of $MgSO_4$ in the polyhalite, no permanent color appeared in the mixture but, as soon as a slight excess of lime had been added, the blue color of the thymolphthalein appeared and remained in the hot mixture. This end point was reached in 3 or 4 minutes. Since the blue color was indicative that all the magnesium sulphate had been changed to magnesium hydroxide, it therefore definitely followed that all of the polyhalite had been disintegrated. Furthermore, the filtered solution when tested was found to contain all of the potassium sulphate from the polyhalite.

Even in cold water this reaction takes place fairly rapidly, and is completed in about two hours, but under this cold treatment the concentration of the solution can not in general be raised above 3.5% at 31.8° C. Although the latter concentration could be attained by leaching the polyhalite simply with water, yet in the latter case the time required would be from thirty to sixty hours instead of two hours.

In order to show how this new fact can be used for the rapid and complete extraction of potassium sulphate from polyhalite with the formation of a relatively concentrated (about 8%) solution, the following is an actual trial which I have carried out. 40 grams of polyhalite were ground to pass through a 100 mesh sieve. Then 2.3 grams of pure calcium oxide were slaked with a little water, and this slurry was added to 160 grams of 3.5% solution (hot) of potassium sulphate. This hot mixture was added to the 40 grams of polyhalite, the mixture was stirred vigorously and kept hot for five minutes, and then filtered through a hot funnel with the aid of suction. The resulting filtrate (137 grams) was found to contain 8% of potassium sulphate.

The solid remaining on the filter, after washing with about 40 grams of hot solution of potassium sulphate (3.5%), yielded a filtrate of 44 grams of 7% solution of potassium sulphate. The solid was then removed from the filter, mixed with 150 grams of cold solution of potassium sulphate (1.5%), and to this was added 1.4 grams of calcium oxide which had been slaked in a few cc. of water. The mixture was stirred steadily with the aid of pebbles, for two hours, when the filtrate therefrom was found to be 3.5% solution of potassium sulphate. The solid was then washed repeatedly with cold water and finally found to be free from potassium sulphate.

These quantities present the following relations:

(1) 40.0 grams of polyhalite contain____ 40×.27=10.8 grams $K_2SO_4$
(2) 2.3 grams CaO "liberate" therefrom_____ $\frac{2.3}{56}$×174= 7.15 grams $K_2SO_4$
(3) The 3.5% solutions (160+40=200 grams) introduce_____ 200×.035= 7.0 grams $K_2SO_4$
(4) The filtrates remove
    137×.08=10.95 grams $K_2SO_4$
    44×.07= 3.08 grams $K_2SO_4$
    Total =14.03 grams $K_2SO_4$ Total free $K_2SO_4$ introduced in (2) and (3)_____=14.15 grams $K_2SO_4$
Total removed in (4)_____=14.03 grams $K_2SO_4$
Remainder_____ 0.12 grams $K_2SO_4$ (5) Remainder in "cake" liberated by the additional 1.4 grams lime is_____ 10.8−7.15= 3.65 grams $K_2SO_4$
(6) Total in "cake" is_____ = 3.77 grams $K_2SO_4$
(7) Amount of potassium sulphate introduced with 150 grams of 1.5% solution_____ = 2.25 grams $K_2SO_4$
(8) Amount in the total liquid of the preceding mixture after stirring (about) 170 grams of liquid, 3.5% $K_2SO_4$_____ = 6.0 grams $K_2SO_4$
(9) Hence, amount thus extracted from "cake" (8) minus (7)_____ = 3.75 grams $K_2SO_4$ While these quantities are in the proportions in which they may be used in a particular continuous process of extraction, yet they are intended primarily to show that an 8% solution of potassium sulphate is obtainable by these means when working at 100° C. and that a 3.5% solution is obtainable at room temperatures from the residue left from the hot extraction, and that finally all of the potassium sulphate can be readily extracted or washed out of the residue. A little inspection will reveal that with a suitable choice of the relative quantities of water, lime, and solid matter for the different extraction steps, a continuous extracting process can always be operated, as a result of which the potassium sulphate will be obtained wholly in the form of an approximately 8% solution while the residue will be obtained free from potassium sulphate.

While this procedure is based upon the above newly revealed facts concerning the rapid action of lime on polyhalite, it also makes special use of the following equilibrium relations between solutions of potassium sulphate and solid calcium sulphate namely:

(a) At and below 31.8° C. syngenite ($CaSO_4,K_2SO_4,H_2O$) is the only double salt that its component salts can form, and this combination is not formed unless the concentration of the potassium sulphate exceeds 3.5% at 31.8° C. (somewhat less at lower temperatures). Hence, if the decomposition of polyhalite takes place at these low temperatures, and the concentration of the potassium sulphate in the solution does not rise above this limit of 3.5%, then all of the potassium sulphate may be extracted from the solid.

(b) At 100° C., syngenite is not formed until the concentration of the potassium sulphate rises above 8.2%. However, another double salt (the so called penta salt $5CaSO_4,K_2SO_4,H_2O$.) will form when the potassium sulphate concentration exceeds 1%,—but this salt is formed only very slowly. It is the outstanding fact of this process that the polyhalite can be disintegrated so rapidly by means of lime as to make it possible to attain a concentration near the limit at which syngenite begins to form, without involving the formation of appreciable amounts of the penta salt.

As a further result from the above action comes the fact that the residual dry solid mass has the following composition:

Per cent
Gypsum, $CaSO_4,2H_2O$_____ 90
Magnesium hydroxide_____ 10 so that, when properly dehydrated, this solid will be a good wall plaster. Even its color will be pleasing although the polyhalite has a deep red color as a rule. This change in color is due to the fact that the newly formed calcium sulphate and magnesium hydroxide, produced by the action between lime and magnesium sulphate, cover the red particles left by the decomposition of the polyhalite. The resulting material has only a light pink color or rose tint, which is as pleasing to the eye almost as an absolute white.

Hence, this residual dry solid mass is a valuable by-product as a potential wall plaster.

Furthermore, the magnesium hydroxide contained in the solid residue may be extracted as a separate by-product namely, magnesite. This extraction can be carried out by any of the commercial methods now in use for extracting magnesite from dolomite. This possibility still further enhances the value of this process as a whole.

It is obvious that those skilled in the art may vary the steps and combinations of steps constituting the process without departing from the spirit of the invention, and therefore it is not desired to be limited to the foregoing except as may be required by the claims.

What is claimed is:—

1. The process of treating polyhalite and minerals of similar composition which consists in taking the finely crushed mineral, an amount of lime substantially equivalent to the magnesium in the mineral, and a suitable amount of hot water, mixing these together for a few minutes only while stirring the mass rapidly and thoroughly, and heating it to boil vigorously in order to complete the reaction and to dissolve the potassium sulphate as quickly as possible; then filtering it immediately and in such a manner as to separate the solution from the solid; and washing the solid as quickly as possible and before the formation of any substantial amount of penta salt, to obtain a fairly concentrated solution of potassium sulphate.

2. The process of treating polyhalite and minerals of similar composition which consists in taking the finely crushed mineral, an amount of lime substantially equivalent to the magnesium in the mineral, and a suitable amount of hot dilute solution of potassium sulphate, mixing these together for a few minutes only while stirring the mass rapidly and thoroughly, and heating it to boil vigorously in order to complete the reaction and to dissolve the potassium sulphate as quickly as possible; then filtering it immediately and in such a manner as to separate the solution from the solid; and washing the solid as quickly as possible and before the formation of any substantial amount of penta salt, to obtain a fairly concentrated solution of potassium sulphate.

3. The process of treating polyhalite and minerals of similar composition which consists in taking the finely crushed mineral, an amount of lime somewhat less than the magnesium in the mineral, and a suitable amount of hot water, mixing these together for a few minutes only while stirring the mass rapidly and thoroughly, and heating it to boil vigorously, in order to complete the reaction and to dissolve the potassium sulphate as quickly as possible; then filtering it immediately and in such a manner as to separate the solution from the solid; washing the solid as quickly as possible and before the formation of any substantial amount of penta salt, to obtain a fairly concentrated solution of potassium sulphate; and treating the solid residue with cold water and more lime to extract the remainder of the potassium sulphate contained therein.

4. The process of treating polyhalite and minerals of similar composition which consists in taking the finely crushed mineral, an amount of lime somewhat less than the magnesium in the mineral, and a suitable amount of hot dilute solution of potassium sulphate, mixing these together for a few minutes only while stirring the mass rapidly and thoroughly, and heating it to boil vigorously in order to complete the reaction and to dissolve the potassium sulphate as quickly as possible; then filtering it immediately and in such a manner as to separate the solution from the solid; washing the solid as quickly as possible and before the formation of any substantial amount of penta salt, to obtain a fairly concentrated solution of potassium sulphate; and treating the solid residue with cold water and more lime to extract all of the potassium sulphate contained therein.

EUGENE P. SCHOCH.